(12) United States Patent
Shpilyuck et al.

(10) Patent No.: US 12,348,408 B2
(45) Date of Patent: Jul. 1, 2025

(54) IDENTIFYING THE HEALTH STATE OF EDGE DEVICES

(71) Applicant: Dell Products L.P., Round Rock, TX (US)

(72) Inventors: Boris Shpilyuck, Ashdod (IL); Maxim Balin, Gan-Yavne (IL); Nisan Haimov, Beer Sheva (IL); Igor Dubrovsky, Beer Sheva (IL)

(73) Assignee: Dell Products L.P., Round Rock, TX (US)

( * ) Notice: Subject to any disclaimer, the term of this patent is extended or adjusted under 35 U.S.C. 154(b) by 159 days.

(21) Appl. No.: 18/495,162

(22) Filed: Oct. 26, 2023

(65) Prior Publication Data
US 2025/0141781 A1  May 1, 2025

(51) Int. Cl.
*H04L 45/12* (2022.01)
*H04L 45/28* (2022.01)

(52) U.S. Cl.
CPC ............ *H04L 45/127* (2013.01); *H04L 45/28* (2013.01)

(58) Field of Classification Search
CPC .............................. H04L 45/127; H04L 45/28
See application file for complete search history.

(56) References Cited

U.S. PATENT DOCUMENTS

| | | | |
|---|---|---|---|
| 10,135,916 B1* | 11/2018 | Farhangi | H04L 43/0817 |
| 2012/0321052 A1* | 12/2012 | Morrill | H04L 45/28 379/32.01 |
| 2023/0016719 A1* | 1/2023 | Kerry | G06F 11/327 |

* cited by examiner

*Primary Examiner* — Chris Parry
*Assistant Examiner* — Hassan Abdur-Rahman Khan
(74) *Attorney, Agent, or Firm* — WOMBLE BOND DICKINSON (US) LLP

(57) ABSTRACT

Methods and systems for managing operation of a distributed system comprising a data center and edge devices. The operation of the distributed system may be managed by monitoring the edge devices. The edge devices may be monitored by identifying the health state of an edge device. The health state of the edge device may be identified by collecting data from operation of similar edge devices and the edge device and comparing the differences in between the data. If the differences between the data from the operation of the similar edge devices and operation of the edge device may exceed criteria for deviation, then the edge device may be determined to be in an unhealthy health state.

20 Claims, 7 Drawing Sheets

IDENTIFYING THE HEALTH STATE OF EDGE DEVICES

FIELD

Embodiments disclosed herein relate generally to managing operation of a distributed system. More particularly, embodiments disclosed herein relate to identifying the health state of edge devices within a distributed system.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
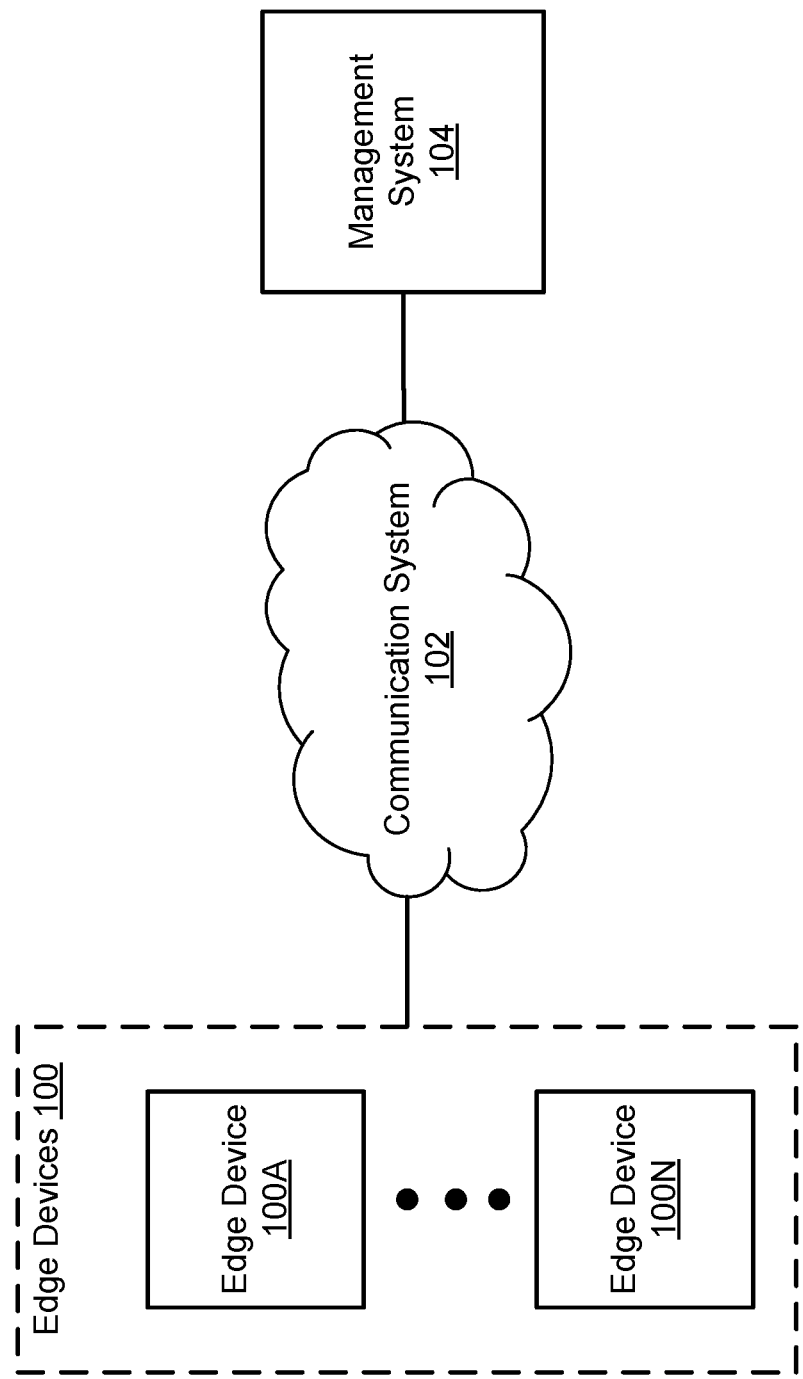
FIG. 1 shows a diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of a distributed system comprising a data center and edge devices. The operation of the distributed system may be managed by monitoring the health states of the edge devices. When the health state of an edge device of the edge devices may be suspected to be unhealthy, a health state request may be received by the data center or by the edge devices.

When the health state request is received, the edge device that is suspected of having an unhealthy health state may be examined. The edge device may be examined by comparing operation of the edge devices to similar edge devices.

A list of first similar edge devices may be generated by searching for the edge devices having an environment similar to the edge device. The list of the first similar edge devices may be filtered by searching within the list of the first similar edge devices for edge devices containing hardware components similar to the edge device. From filtering the list of the first similar devices, a second list of the similar edge devices may be generated.

The second list of the second edge devices may be filtered by searching within the list of the second list of the second similar edge devices for edge devices that have data processing throughputs similar to the edge device. From filtering the list of the second similar devices, a final list of the similar edge devices may be generated.

Using the final list of the similar edge devices and the edge device, measurements of, at least, temperature, power consumption, and data processing throughput may be collected. Using the measurements, differences in temperature, power consumption, and data processing throughput may be computed between the final list of the similar devices and the edge device. Aggregate differences, including average differences, may be computed between the final list of the similar devices and the edge device may be computed and compared to maximal average deviation thresholds.

If the aggregate differences meet or exceed the maximal average deviation thresholds, then the edge device may be marked as an edge device with an unhealthy health state. Otherwise, if the aggregate differences do not meet or exceed the maximal average deviation thresholds, then the edge device may continue operation in a healthy health state.

In an embodiment, a method for managing operation of a distributed system comprising a data center and edge devices. The method may include: (i) obtaining a health status request to assess a health status of an edge device of the edge devices; (ii) identifying a final portion of the edge devices that are similar to the edge device; (iii) for a first edge device of the final portion of the edge devices, obtaining metrics for the first edge device; (iv) obtaining differences between the metrics for the first edge device and metrics for the edge device; (v) obtaining an aggregate difference between the edge device and the final portion of the edge devices using, at least in part, the differences; (vi) making a determination regarding whether the aggregate difference meets a criteria that when met indicates that the edge device is in an unhealthy state; (vii) in a first instance of the determination where the aggregate difference meets the criteria: (a) concluding that the edge device has an unhealthy health status; (b) updating the operation of the distributed system based on the unhealthy health status of the edge device to obtain an updated distributed system; and (c) providing computer implemented services using the updated distributed system.

Identifying the final portion of the edge devices may include performing a lookup, based on precomputed similarities, to obtain a list of the final portion of the edge devices, the lookup being performed using a data structure that associates portions of the edge devices based on environmental locations, hosted hardware components, and typical workloads.

Identifying the final portion of the edge devices may also include: (i) filtering the edge devices based on environments in which each of the edge devices resides to identify a portion of the edge devices that are situated in an environment that is similar to an environment in which the edge device is situated; (ii) filtering the portion of the edge devices based on hosted hardware components of the edge device to identify a second portion of the edge devices that are both situated in the environment that is similar to the environment in which the edge device is situated and that each have hosted hardware components that are similar to hosted hardware components of the edge device; and (iii) filtering the second portion of the edge devices based on workloads performed by the edge device to identify the final portion of the edge devices that: (a) are situated in the environment that is similar to the environment in which the edge device is situated; (b) each have hosted hardware components that are similar to hosted hardware components of the edge device, and (c) each host workloads that are similar to workloads hosted by the edge device.

The metrics for the edge device comprise first measurements of, at least, operational temperatures of the edge device, power consumption by the edge device, and data processing throughput by the edge device, and the metrics for the first edge device comprise second measurements of, at least, operational temperatures of the first edge device, power consumption by the first edge device, and data processing throughput by the first edge device.

Obtaining the differences may include: (i) obtaining the metrics for the first edge device; (ii) obtaining the metrics for the edge device; and (iii) computing the difference between the metrics for the first edge device and the metrics for the edge device.

The aggregate difference is an average difference between the edge device and the final portion of the edge devices.

The criteria is a threshold and the aggregate difference needs to equal or exceed the threshold for the criteria to be met.

Updating the operation of the distributed system may include changing, for the edge device, a trusted status to an untrusted status.

Providing computer implemented services may include performing, by the edge devices, a computation that excludes at least some of data from the edge device based on the untrusted status of the edge device.

The method may further include in a second instance of the determination where the aggregate difference does not meet the criteria: concluding that the edge device has a healthy health status.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a system in accordance with an embodiment is shown. The system may provide any number and types of computer implemented services (e.g., to user of the system and/or devices operably connected to the system). The computer implemented services may include, for example, data storage service, instant messaging services, etc.

To provide computer implemented services, the system of FIG. 1 may include edge devices 100. Edge device may provide all or a portion of the computer implemented services. To provide the computer implemented services, edge devices 100 may include hardware and/or software components that contribute to the provided computer implemented services.

For the hardware and/or software components to provide the computer implemented services, the hardware and/or software components may need to operate in predetermined manners. If the hardware and/or software components do not operate in the predetermined manner, then the computer implemented services may be impacted. For example, the computer implemented services may not be provided at all and/or may be provided in a degraded manner.

The operations of edge devices may affect temperature, power consumption, and/or data processing throughput. The temperature, power consumption, and data processing throughput may, over time, affect the performance of edge devices 100. The performance of edge devices 100 may begin their lifecycles performing the operations optimally. However, operating over the lifecycles of edge devices 100, the performance of edge devices 100 may deteriorate. Deterioration of edge devices 100 may be caused by prolonged exposure to weather conditions in the outside world, natural disasters, physical deformation and/or security compromises by a malicious actor or third-party entity. Deterioration of edge devices 100 may cause fluctuations in temperature, power consumption, and/or data processing throughput to maintain operations.

Despite the fluctuations in temperature, power consumption, and/or data processing throughput to maintain operations, edge devices 100 may continue to deteriorate because of the fluctuations. The fluctuations in temperature, power consumption and/or data processing throughout may damage hardware of edge devices 100, thus resulting in further deterioration. Damage to the hardware of edge devices 100 may render the output of edge devices 100 to be untrustworthy.

In general, embodiments disclosed here relate to systems and methods for managing operations of a distributed system. To manage the operation of the distributed system, unhealthy devices of the distributed system may be identified. The unhealthy edge devices may be devices that have and/or are deteriorating to a degree that the operation of these devices is and/or is likely to be impaired. Such devices may be managed, for example, via remediation and/or replacement to return the unhealthy devices to a healthy state.

To identify the unhealthy devices, a management entity and/or other components of the distributed system may obtain information regarding a device suspected of being unhealthy, and similar information from similar devices.

To identify devices that are similar to the suspect device, the devices of the distributed system may first be filtered to identify a first sub-set of the devices that are located in similar environments to the suspect device. For example, the devices may be filtered based on their proximity (e.g., a first-nearest neighbor) to a suspect device.

Once obtained, the subset may be further filtered to identify a second subset of the devices that are in similar environments to the suspect device and that include similar hardware components to the unhealthy device.

Figure 2A:
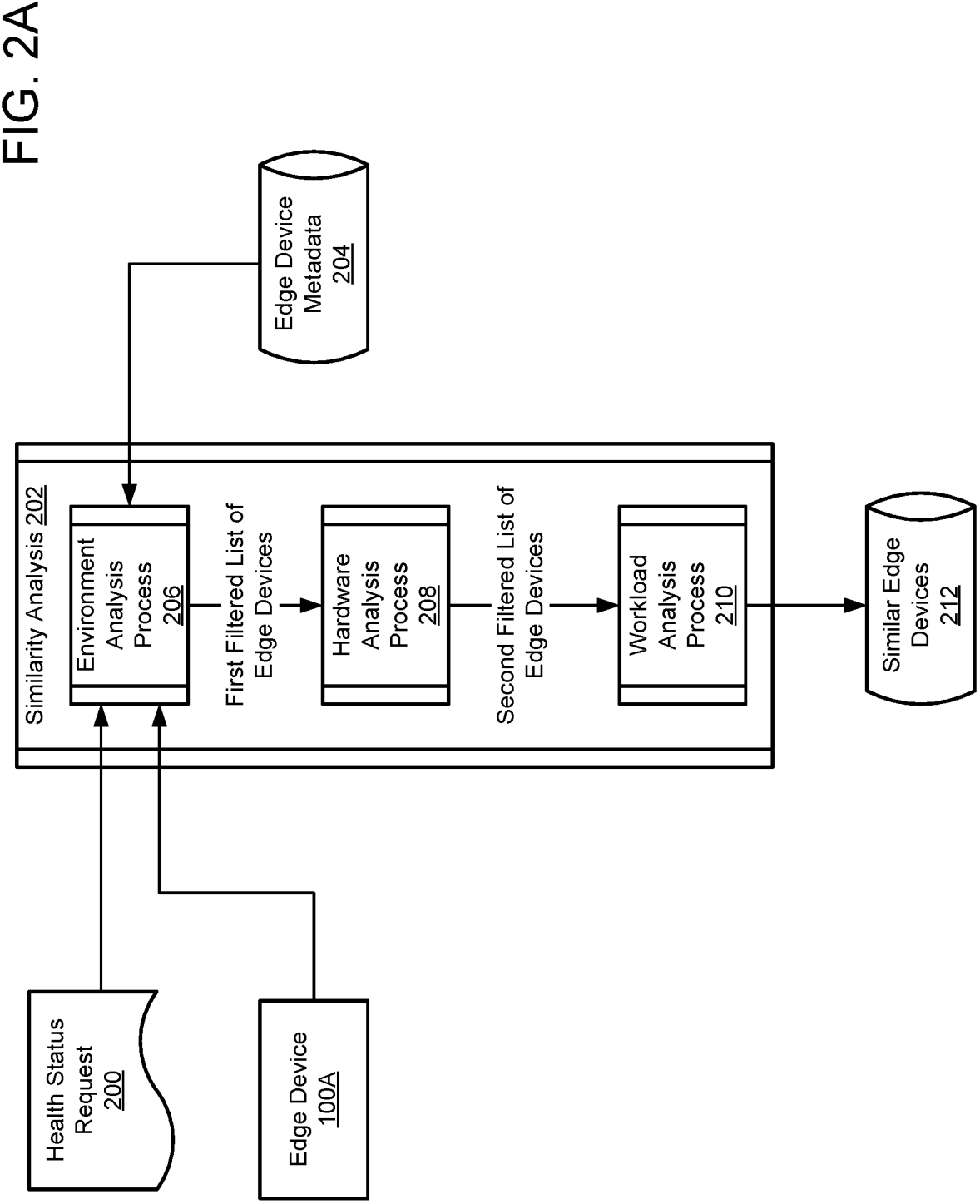
FIG. 2A-2C show data flow diagrams illustrating operation of a system in accordance with an embodiment.

Once obtained, the second subset may be filtered an additional time to obtain a final set of device. The second subset may be to identify devices that are located in a similar environment, include similar hardware components, and that perform similar workloads to the suspect device. Refer to FIG. 2A for additional details regarding filter devices.

Once the final subset is identified, information regarding operation of each of the member devices of the final subset of devices is obtained. The obtained information may include temperatures, power consumption, data processing throughput, and/or other characteristics of the operation of the final subset of the devices. Using the information, statistical characterizations (e.g., averages, means, median, mode, etc.) of the operation may be obtained. Once obtained, thresholds may be set for each characteristic regarding the operation of the suspect device.

Figure 2B:
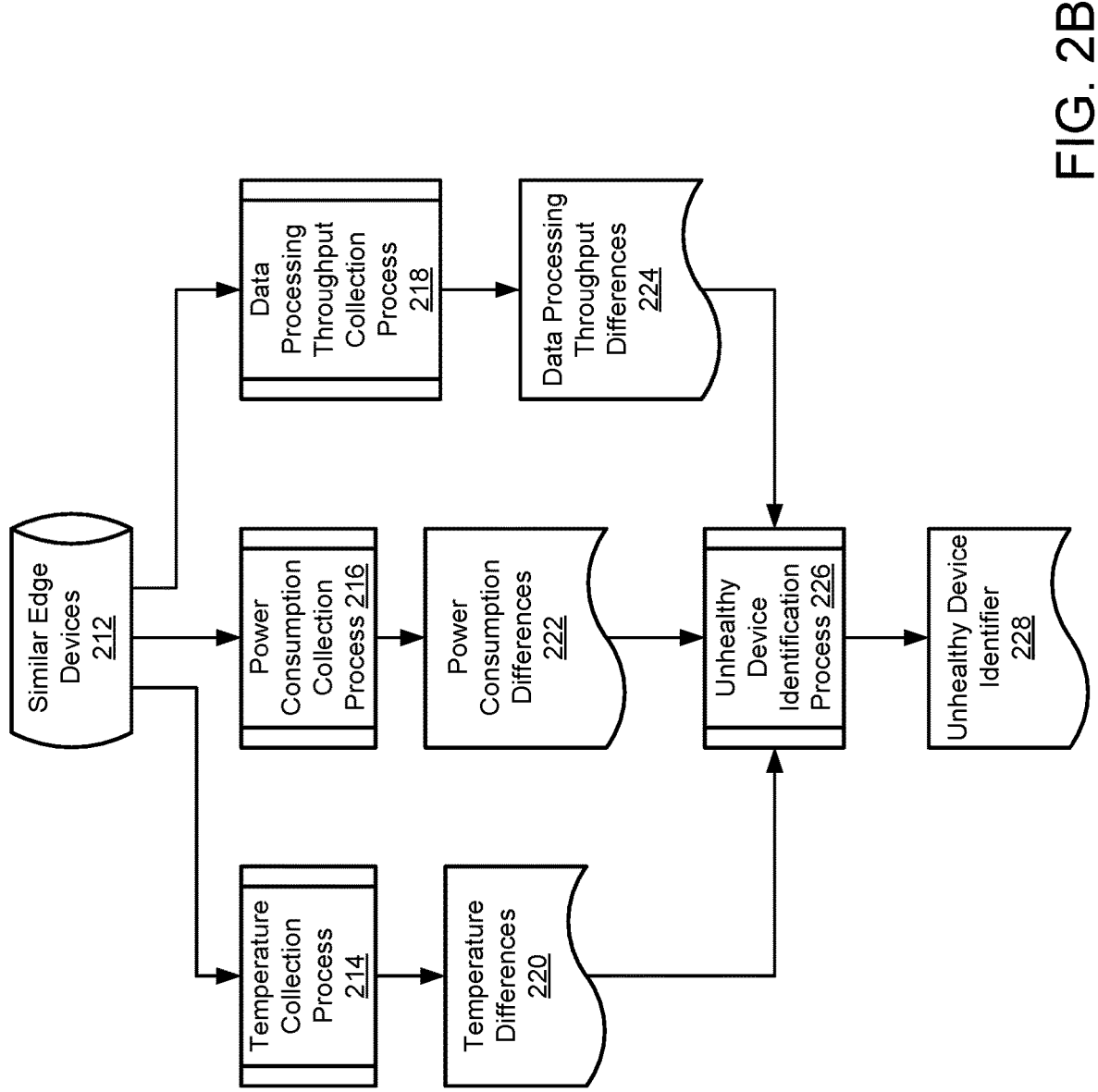
Figure 2C:
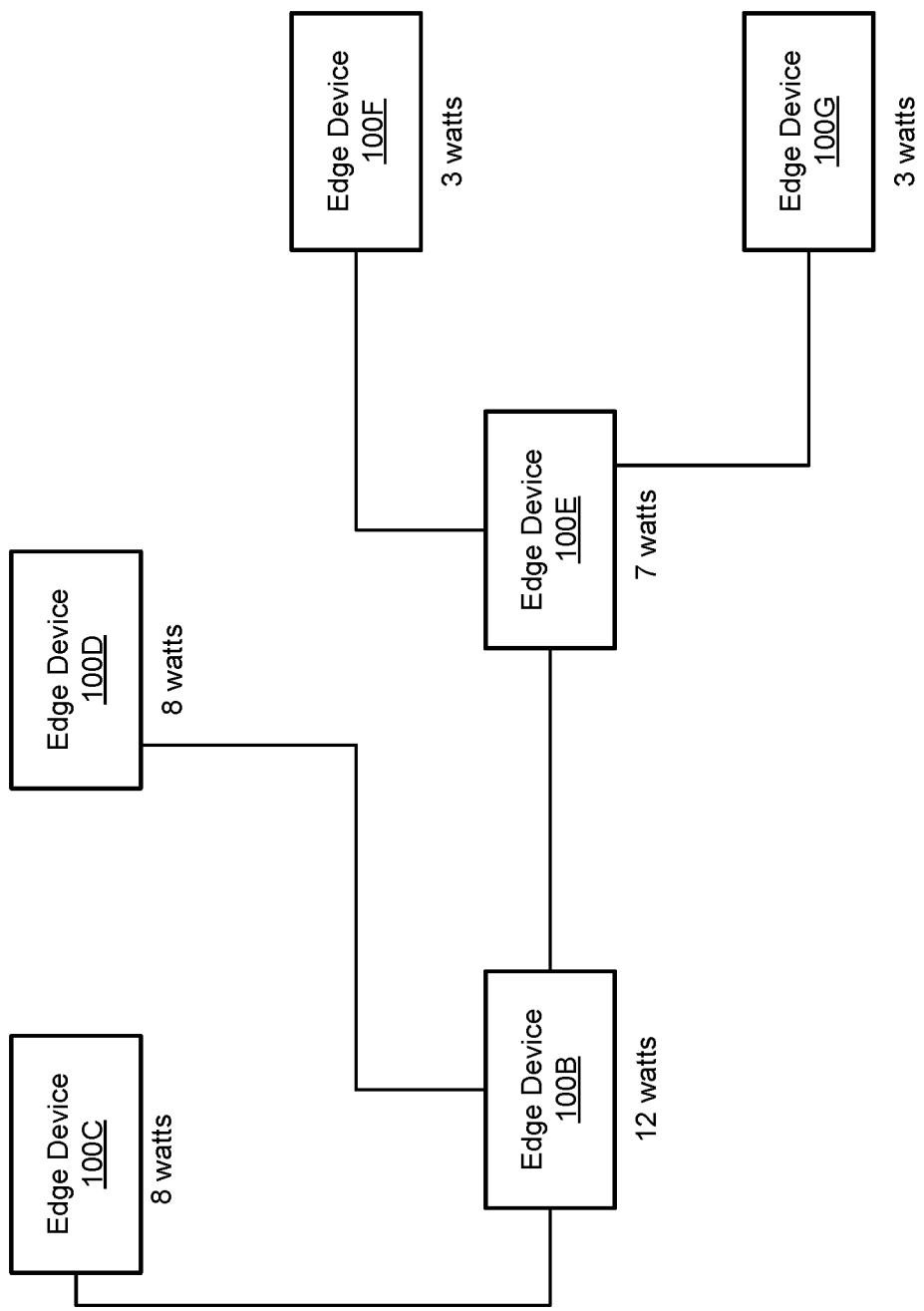

Once obtained, the corresponding characteristics of operation of the suspected device may be compared to the thresholds to identify whether the thresholds indicate that the suspect devices is in a health or unhealthy state. If the suspect device is in an unhealthy state, then the suspect device may be marked with an unhealthy health status and the data output from marked suspect device may be considered as untrustworthy. Refer to FIGS. 2B-2C for additional details regarding determination and use of health statuses of suspect devices.

If marked as unhealthy, the suspect device may be scheduled for remediation and/or replacement to return the unhealthy device to health or replace it with a healthy device. If remediated, various processes for remediating the unhealthy device may be performed. The remediation processes may include (i) increasing monitoring of the unhealthy device, (ii) scheduling service technician action to address the unhealthy state of the device, and/or other actions to manage impacts of the unhealthy status of the device.

By doing so, embodiments disclosed herein may facilitate identification of unhealthy devices in a variety of conditions. By not relying on static criteria to identify unhealthy device, the disclosed approach may automatically adapt itself to the environmental conditions and workloads performed by devices that may otherwise cause static criteria to indicate that healthy devices are actually unhealthy.

To provide the above noted functionality, the system may include edge devices 100, and management system 104. Each of these components is discussed below.

Edge devices 100 may include any number of edge device 100A-100N. Edge device 100A-100N may provide computer implemented services and participate in health status determinations for the edge device. To participate in the health status determination, each of edge devices 100 may maintain and provide information regarding its operation to other devices.

Management system may manage edge devices 100. To manage edge devices 100, management system 104 may (i) obtain health statuses for edge devices 100, and (ii) manage remediation and/or replacement of unhealthy devices. For example, managements system 104 may, when an unhealthy device is identifies, (i) instantiate automated processes for data collection from the unhealthy device, (ii) schedule service technician time to review and remediate the unhealthy status, (iii) initiate automated attempts at remediation (e.g., using playbooks keyed to health status and/or characteristics of the operation of the unhealthy devices), and/or (iv) perform other actions to manage the health of unhealthy devices.

Any of (and/or components thereof) edge devices 100 and management system 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

While illustrated in FIG. 1 as including a limited number of specific components, a system in accordance with an embodiment may include fewer, additional, and/or different components than those components illustrated therein.

Thus, as shown in FIG. 1, a system in accordance with an embodiment may manage operations of a distributed system comprising of data center 104 and edge devices 100.

To further clarify embodiments disclosed herein, data flow diagrams in accordance with an embodiment are shown in FIGS. 2A-2C. In these diagrams, flows of data and processing of data are illustrated using different sets of shapes. A first set of shapes (e.g., 200, 220, etc.) is used to represent data structures, a second set of shapes (e.g., 206, 208, etc.) is used to represent processes performed using and/or that generate data, and a third set of shapes (e.g., 204, 212, etc.) is used to represent large scale data structures such as databases.

Turning to FIG. 2A, a first data flow diagram in accordance with an embodiment is shown. The first data flow diagram may illustrate data used in and data processing performed in analysis of the health of a device.

The analysis process may be initiated, for example, by receipt of health status request 200. Health status request 200 may be a request to identify the health status of a device that is suspected of being unhealthy (e.g., due to the device operating unsatisfactorily). For example, health status request 200 may indicate that edge device 100A is suspected of being unhealthy.

To fulfill health status request 200, edge device 100A may be subjected to similarity analysis 202. During similarity analysis 202, edge devices 100 may be searched for edge devices that are similar to edge device 100A. To search through edge devices 100 for similar devices to edge device 100A, a multistage filtering process may be performed (e.g., processes 206-210). During the multistage filtering process, edge device metadata 204 may be used. Edge device metadata 204 may include characteristics of the operational of edge devices 100. The characteristics may include location, nearest-neighbor edge devices, temperatures, power consumption, data processing throughput, and/or other characteristics regarding the operation of edge devices 100.

The multistage filtering process may begin with environment analysis process 206. During environment analysis process 206, the locations of edge devices 100 may be read from edge device metadata 204 and ingested. Using ingesting the locations, environment analysis 206 may search for all nearest-neighbor edge devices connected to edge device 100A. The result of environment analysis 206 may be a first filtered list of edge devices (e.g., the portion of edge devices located nearest edge device 100A and that are likely to be located in a similar environment to edge device 100A by virtue of their proximity).

Once obtained, the first filtered list of edge devices may be further filtered through ingestion by hardware analysis 208. During hardware analysis process 208, the first filtered list of edge devices may be searched for edge devices that have hardware components similar to those included in edge device 100A. The level of similarity may be defined, for example, by a set of rules, an objective function, and/or other modality for identifying devices that have similar hardware and/or quantifications regarding the similarity. Thus, hardware analysis process 208 may find edge devices with hardware components that are similar to hardware components of edge device 100A, and that are likely to be in similar environments to the environment in which edge device 100A is located (e.g., by only searching the first filtered list). The result of hardware analysis 208 may be a second filtered list of edge devices.

The second filtered list of edge devices may be further filtered through ingestion by workload analysis process 210. During workload analysis process 110, the second filtered list of edge devices may be searched for edge devices that have data processing throughput (e.g., rates of generating processing results, rates of transmission of data, rate of reception of data from other devices, etc.) that is similar to that of edge device 100A, and that have both similar hardware to and existing in similar environments to edge device 100A (e.g., by only searching the second filtered list). Thus, workload analysis process 210 may find edge devices that inputs, processes, and outputs similar quantities of data as edge device 100A from the second filtered list. The result of hardware analysis process 208 may be similar edge devices 212 (e.g., a final filtered list).

Thus, using the interaction diagram shown in FIG. 2A, embodiments disclosed herein may facilitate identification of similar devices in terms of environment, hardware components, and throughput (e.g., processing load).

Turning to FIG. 2B, a second data flow diagram in accordance with an embodiment is shown. The second data flow diagram may illustrate data used in and data processing performed in identifying whether a device is unhealthy.

Continuing with the discussion from FIG. 2A, once similar edge devices 212 is obtained, similar edge devices 212 may be used to determine the health status of edge device 100A. To do so, multiple processes (e.g., 214, 216, 218) of comparison between edge device 100A and the similar edge devices 212 may be performed. For example, similar edge devices 212 may be ingested by temperature collection 214, power consumption collection 216, and data processing throughput collection 218. During temperature collection process 214, temperature measurements of the similar edge devices while in operation may be taken. Temperature measurements may of edge device 100A while in operation may also be taken. The temperature measurements may be used to compute temperature differences 220 between similar edge devices 212 and edge device 100A.

Temperature differences 220 may include average differences between similar edge devices 212 and edge device 100A. Temperature differences 220 may be used to measure how different the temperature of edge device 100A is from temperatures of similar edge devices 212.

Similarly, during power consumption collection process 216, measurements of the power consumed by the similar edge devices while in operation. Power consumption measurements of edge device 100A while in operation may also be taken. The power consumption measurements may be used to compute power consumption differences 222 between similar edge devices 212 and edge device 100A.

Power consumption differences 222 may include average differences between similar edge devices 212 and edge device 100A. Power consumption differences 222 may be used to measure how different the power consumption is of edge device 100A is from power consumption by similar edge devices 212.

Like the temperature and power consumption measurements, during data processing throughput collection process 218, measurements of the data processing throughput of similar edge devices while in operation may be taken. Data processing throughput measurements may also be taken of edge device 100A while in operation. Data processing throughput measurements may be used to compute data processing throughput differences 224 between similar edge devices 212 and edge device 100A.

Data processing throughput differences 224 may include average differences between similar edge devices 212 and edge device 100A. Data processing throughput differences 224 may be used to measure how different the data processing throughput is of edge device 100A is from data processing throughput by similar edge devices 212.

Once temperature differences 220, power consumption differences 222, and data processing throughput differences 224 are obtained, a determination may be made regarding the health status of edge device 100A. The determination may be made by unhealthy device identification 226.

During unhealthy device identification process 226, edge device 100A may be found to be operating in an unhealthy health status if (i) temperature difference 220 is equal to or greater than a temperature threshold, (ii) power consumption differences 222 is equal to or greater than a power consumption threshold, then edge device 100A may marked with an unhealthy health status, and/or (iii) data processing throughput differences 224 is equal to or greater than a power consumption threshold. Unhealthy device identification process 226 may yield unhealthy device identifier 228, which may be used to identify edge device 100A.

Thus, using the flows shown in FIG. 2B, embodiments disclosed herein may facilitate a process for identifying the health status of a device with dynamic standards that adapt to the conditions impacting each device. In contrast to static metrics or criteria, the adaptive process disclosed herein may be less likely to flag healthy devices as being unhealthy.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Turning to FIG. 2C, a diagram of an example group of edge devices in accordance with an embodiment is shown.

In the diagram, devices (e.g., 100B-100G) are illustrated in approximate positions with respect to one another.

To manage these devices, various health status of the devices may be determined over time. For example, health status request 200, from FIG. 2A, may request the health status of edge device 100B.

Utilizing the data flow diagram of FIG. 2A, similar edge devices 212 may have been determined to include edge device 100C, edge device 100D, and edge device 100E (e.g., because they are close to one another, have similar hardware components, and perform similar workloads).

To identify the health of edge device 100B, differences between characteristics of operation of these device may be identified. For purposes of simplicity, consider a scenario where only the power consumption level of the devices varies among the devices (all other characteristics being the same).

To compute power consumption differences 222 for these devices, an average power consumption difference may be computed between edge device 100B and similar edge devices 212 (e.g., 100C-100E). Using the flow shown in FIG. 2C, the average power consumption difference at a single time may be [(12 Watts−8 Watts)+(12 Watts−8 Watts)+(12 Watts−7 Watts)]/3=3.66 Watts.

Power consumption collection 216 may ingest more power measurements over multiple times. The power consumption measurements over the multiple times may be used in power consumption differences 222. Power consumption differences 222 may use the power consumption measurements over multiple times to compute an average power consumption difference over multiple times, which may be computed to be 1 Watt in this example.

A difference between the average power consumption difference at a single time and the average power consumption difference over multiple times, which may be computed to be 3.66 Watts−1 Watt=2.66 Watts. The difference may be compared to the maximal deviation allowed for power consumption of an edge device, which may be 1.5 Watts in this example. Since the difference between the average power consumption difference at a single time and the average power consumption difference over multiple times may be greater than the maximal deviation allowed for power consumption of an edge device in this example, unhealthy device identification 226 may determine that edge device 100B may be in unhealthy health state.

Thus, using flows shown in FIGS. 2A-2B, embodiments disclosed herein may adapt the process of health status determination to the conditions present in the system to reduce the likelihood of healthy devices being classified as being unhealthy.

Figure 3A:
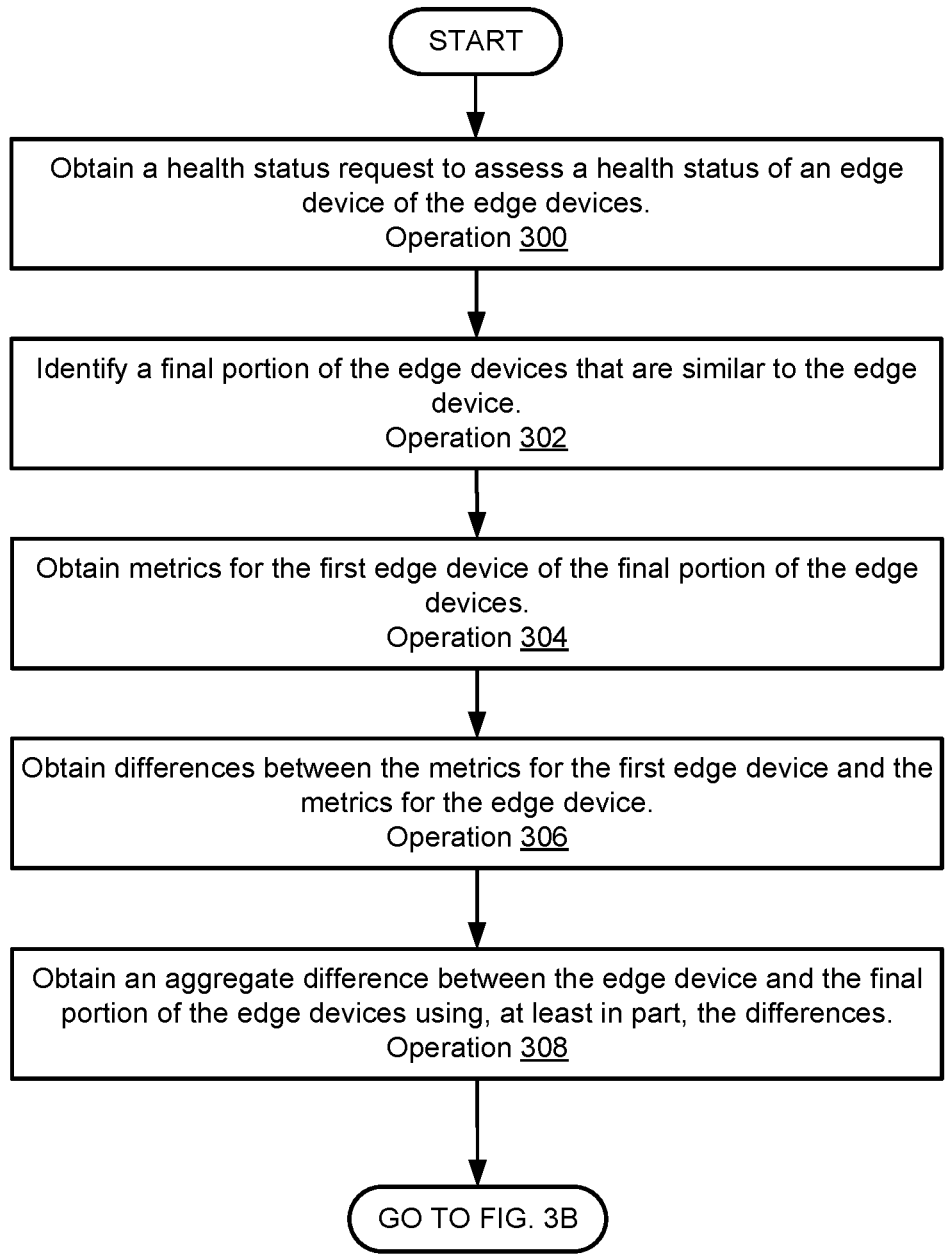
FIGS. 3A-3B show flow diagrams illustrating methods in accordance with an embodiment.
Figure 3B:
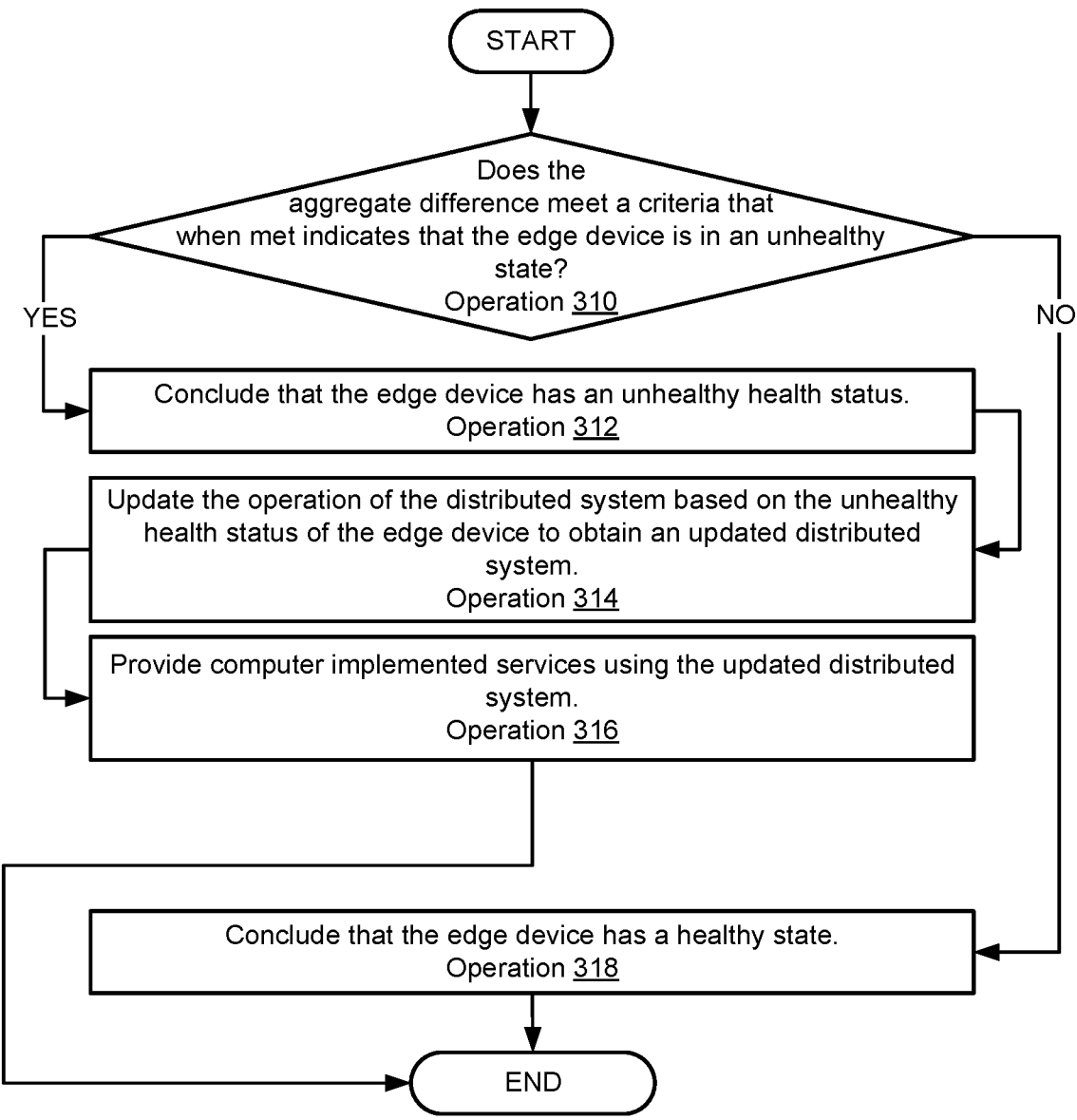

As discussed above, the components of FIG. 1 may perform various methods to store data in distributed systems using a distributed deduplication framework. FIGS. 3A-3B illustrate methods that may be performed by the components of the system of FIG. 1. In the diagrams discussed below and shown in FIGS. 3A-3B, any of the operations may be repeated, performed in different orders, and/or performed in parallel with or in a partially overlapping in time manner with other operations.

Turning to FIG. 3A, a first flow diagram illustrating a method of managing operation of a distributed system comprising a data center and edge devices in accordance with an embodiment is shown. The method may be performed, for example, by any of the components of the system of FIG. 1, and/or other components not shown therein.

At operation 300, a health status request may be obtained to assess a health status of an edge device of the edge devices. The health status may be obtained by receiving the health status by the data center or one or more edge devices of the edge devices.

A final portion of the edge devices may be identified that may be similar to the edge device. The final portion of the edge devices may be identified by performing a lookup, based on precomputed similarities, to obtain a list of the final portion of the edge devices, the lookup being performed using a data structure that associates portions of the edge devices based on environmental locations, hosted hardware components, and typical workloads. The lookup may be performed by querying, by the data center or one or more edge devices of the edge devices, a catalog for metadata on the edge devices to obtain the list of the final portion of the edge devices.

The final portion of the edge devices may also be identified by (i) filtering the edge devices based on environments in which each of the edge devices resides to identify a portion of the edge devices that are situated in an environment that is similar to an environment in which the edge device is situated; (ii) filtering the portion of the edge devices based on hosted hardware components of the edge device to identify a second portion of the edge devices that are both situated in the environment that is similar to the environment in which the edge device is situated and that each have hosted hardware components that are similar to hosted hardware components of the edge device; and (iii) filtering the second portion of the edge devices based on workloads performed by the edge device to identify the final portion of the edge devices that (a) are situated in the environment that is similar to the environment in which the edge device is situated, (b) each have hosted hardware components that are similar to hosted hardware components of the edge device, and (c) each host workloads that are similar to workloads hosted by the edge device.

The edge devices may be filtered based on environments by assessing neighboring edge devices of the edge devices that are similar to nearest neighbor edge devices of the edge device. The portion of the edge devices may be filtered based on hosted hardware components by including edge devices that include and utilize hardware components similar to the edge device. The second portion of the edge devices may be filtered based on workloads by including edge devices that have data throughput processing similar to the edge device.

At operation 304, metrics for the first edge device of the final portion of the edge devices may be obtained. Metrics may be obtained by collecting measurements of, at least, temperatures, power consumption and data processing throughput while the first edge device of the final portion of the edge devices operates.

At operation 306, differences between the metrics for the first edge device and the metrics for the edge device may be obtained. The differences may be obtained by (i) obtaining the metrics for the first edge device; (ii) obtaining the metrics for the edge device; and (iii) computing the difference between the metrics for the first edge device and the metrics for the edge device. Metrics for the first edge device may be obtained by collecting measurements of, at least, temperatures, power consumption and data processing throughput for the first edge device. Metric for the edge device may be obtained by collecting measurements of, at least, temperatures, power consumption and data processing throughput for the edge device. The difference between the metrics may be computed by taking the differences between the measurements for the first edge device and the edge device over multiple times.

At operation 308, an aggregate difference may be obtained between the edge device and the final portion of the edge devices using, at least in part, the differences. The aggregate difference may be obtained by averaging the differences over multiple times at which measurements were collected for the first edge device and the edge device.

Turning to FIG. 3B, FIG. 3B may show a continuation of the flow diagram shown in FIG. 3A.

At operation 310, a determination may need to be made whether the aggregate differences meet a criteria that when met indicates that the edge device is in an unhealthy state. The determination may be made by measuring whether the aggregate difference equals or exceeds a threshold associated with the criteria.

If the aggregate differences meet the criteria, then the method may continue at operation 312. Otherwise, if the aggregate differences do not meet the criteria, then the method may continue at operation 318.

At operation 318, it may be concluded that the edge device has a healthy health state. It may be concluded by demonstrating a deviation in the aggregate differences that does not meet or exceed a threshold deviation.

The method may end following operation 318.

Returning to operation 310, at operation 312, it may be concluded that the edge device has an unhealthy health state. It may be concluded by demonstrating a deviation in the aggregate differences that meets or exceed a threshold deviation.

At operation 314, the operation of the distributed system may be updated based on the unhealthy health status of the edge device to obtain an updated distributed system. The operation may be updated by changing, for the edge device, a trusted status to an untrusted status. The trusted status may be changed by (i) finding the identifier of the edge device, and (ii) replacing the trusted status to the untrusted status for the identifier of the edge device.

At operation 316, computer implemented services may be provided using the updated distributed system. Computer implemented services may be provided by performing, by the edge devices, a computation that excludes at least some of data from the edge device based on the untrusted status of the edge device. The computation may be performed by (i) requesting the data from one or more edge devices not including the edge device, (ii) receiving the data from the one or more edge devices not including the edge device, and (iii) inputting the data into one or more functions to generate second data.

The method may end following operation 316.

Figure 4:
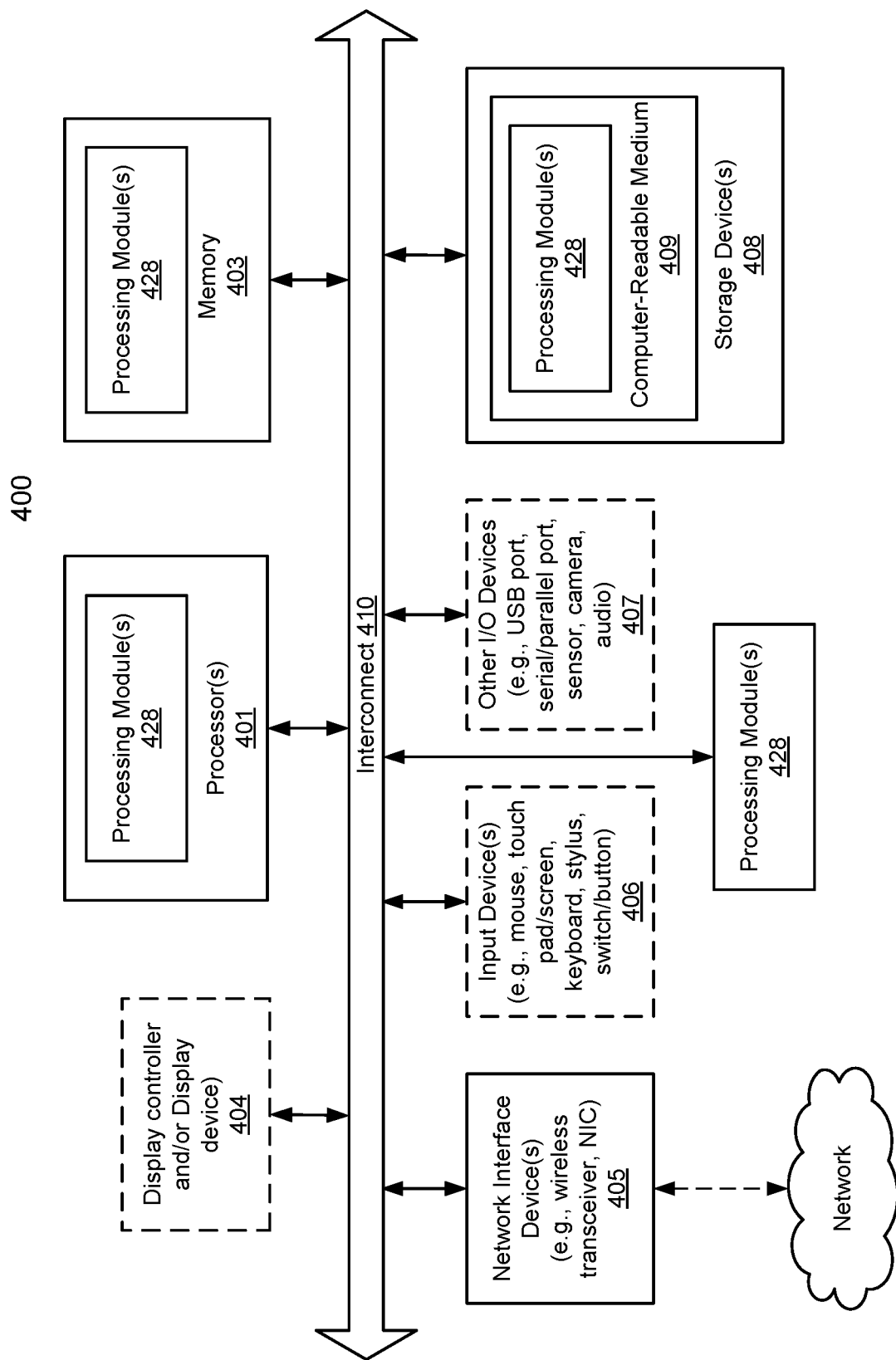
FIG. 4 shows a block diagram illustrating a data processing system in accordance with an embodiment.

Any of the components illustrated in FIGS. 1-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a distributed system comprising a data center and edge devices, the method comprising:
   obtaining a health status request to assess a health status of an edge device of the edge devices;
   identifying a final portion of the edge devices that are similar to the edge device by at least performing a lookup, based on precomputed similarities, to obtain a list of the final portion of the edge devices, the lookup being performed using a data structure that associates portions of the edge devices based on environmental locations, hosted hardware components, and typical workloads;
   for a first edge device of the final portion of the edge devices, obtaining metrics for the first edge device;
   obtaining differences between the metrics for the first edge device and metrics for the edge device;
   obtaining an aggregate difference between the edge device and the final portion of the edge devices using, at least in part, the differences;
   making a determination regarding whether the aggregate difference meets a criteria that when met indicates that the edge device is in an unhealthy state;
   in a first instance of the determination where the aggregate difference meets the criteria:
      concluding that the edge device has an unhealthy health status;
      updating the operation of the distributed system based on the unhealthy health status of the edge device to obtain an updated distributed system; and
      providing computer implemented services using the updated distributed system.

2. The method of claim 1, wherein identifying the final portion of the edge devices comprises:
   filtering the edge devices based on environments in which each of the edge devices resides to identify a portion of the edge devices that are situated in an environment that is similar to an environment in which the edge device is situated;
   filtering the portion of the edge devices based on hosted hardware components of the edge device to identify a second portion of the edge devices that are both situated in the environment that is similar to the environment in which the edge device is situated and that each have hosted hardware components that are similar to hosted hardware components of the edge device; and
   filtering the second portion of the edge devices based on workloads performed by the edge device to identify the final portion of the edge devices that:
      are situated in the environment that is similar to the environment in which the edge device is situated,
      each have hosted hardware components that are similar to hosted hardware components of the edge device, and
      each host workloads that are similar to workloads hosted by the edge device.

3. The method of claim 1, wherein the metrics for the edge device comprise first measurements of, at least, operational temperatures of the edge device, power consumption by the edge device, and data processing throughput by the edge device, and the metrics for the first edge device comprise second measurements of, at least, operational temperatures of the first edge device, power consumption by the first edge device, and data processing throughput by the first edge device.

4. The method of claim 3, wherein obtaining the differences comprises:
   obtaining the metrics for the first edge device;
   obtaining the metrics for the edge device; and
   computing the difference between the metrics for the first edge device and the metrics for the edge device.

5. The method of claim 1, wherein the aggregate difference is an average difference between the edge device and the final portion of the edge devices.

6. The method of claim 1, wherein the criteria is a threshold and the aggregate difference needs to equal or exceed the threshold for the criteria to be met.

7. The method of claim 1, wherein updating the operation of the distributed system comprises:
   changing, for the edge device, a trusted status to an untrusted status.

8. The method of claim 7, wherein providing computer implemented services comprises:
   performing, by the edge devices, a computation that excludes at least some of data from the edge device based on the untrusted status of the edge device.

9. The method of claim 1, further comprising in a second instance of the determination where the aggregate difference does not meet the criteria:
   concluding that the edge device has a healthy health status.

10. A non-transitory machine-readable medium having instructions stored therein, which when executed by a processor, cause the processor to perform operations for managing operation of a distributed system comprising a data center and edge devices, the operation comprising:
   obtaining a health status request to assess a health status of an edge device of the edge devices;

identifying a final portion of the edge devices that are similar to the edge device by at least performing a lookup, based on precomputed similarities, to obtain a list of the final portion of the edge devices, the lookup being performed using a data structure that associates portions of the edge devices based on environmental locations, hosted hardware components, and typical workloads;

for a first edge device of the final portion of the edge devices, obtaining metrics for the first edge device;

obtaining differences between the metrics for the first edge device and metrics for the edge device;

obtaining an aggregate difference between the edge device and the final portion of the edge devices using, at least in part, the differences;

making a determination regarding whether the aggregate difference meets a criteria that when met indicates that the edge device is in an unhealthy state;

in a first instance of the determination where the aggregate difference meets the criteria:
concluding that the edge device has an unhealthy health status;
updating the operation of the distributed system based on the unhealthy health status of the edge device to obtain an updated distributed system; and
providing computer implemented services using the updated distributed system.

11. The non-transitory machine-readable medium of claim 10, wherein identifying the final portion of the edge devices comprises:
filtering the edge devices based on environments in which each of the edge devices resides to identify a portion of the edge devices that are situated in an environment that is similar to an environment in which the edge device is situated;
filtering the portion of the edge devices based on hosted hardware components of the edge device to identify a second portion of the edge devices that are both situated in the environment that is similar to the environment in which the edge device is situated and that each have hosted hardware components that are similar to hosted hardware components of the edge device; and
filtering the second portion of the edge devices based on workloads performed by the edge device to identify the final portion of the edge devices that:
are situated in the environment that is similar to the environment in which the edge device is situated,
each have hosted hardware components that are similar to hosted hardware components of the edge device, and
each host workloads that are similar to workloads hosted by the edge device.

12. The non-transitory machine-readable medium of claim 10, wherein the metrics for the edge device comprise first measurements of, at least, operational temperatures of the edge device, power consumption by the edge device, and data processing throughput by the edge device, and the metrics for the first edge device comprise second measurements of, at least, operational temperatures of the first edge device, power consumption by the first edge device, and data processing throughput by the first edge device.

13. The non-transitory machine-readable medium of claim 12, wherein obtaining the differences comprises:
obtaining the metrics for the first edge device;
obtaining the metrics for the edge device; and
computing the difference between the metrics for the first edge device and the metrics for the edge device.

14. The non-transitory machine-readable medium of claim 10, wherein the aggregate difference is an average difference between the edge device and the final portion of the edge devices.

15. The non-transitory machine-readable medium of claim 10, wherein the criteria is a threshold and the aggregate difference needs to equal or exceed the threshold for the criteria to be met.

16. A data processing system, comprising:
a processor; and
a memory coupled to the processor to store instructions, which when executed by the processor, cause the processor to perform operations for managing operation of a distributed system comprising a data center and edge devices, the operations comprising:
obtaining a health status request to assess a health status of an edge device of the edge devices;
identifying a final portion of the edge devices that are similar to the edge device by at least performing a lookup, based on precomputed similarities, to obtain a list of the final portion of the edge devices, the lookup being performed using a data structure that associates portions of the edge devices based on environmental locations, hosted hardware components, and typical workloads;
for a first edge device of the final portion of the edge devices, obtaining metrics for the first edge device;
obtaining differences between the metrics for the first edge device and metrics for the edge device;
obtaining an aggregate difference between the edge device and the final portion of the edge devices using, at least in part, the differences;
making a determination regarding whether the aggregate difference meets a criteria that when met indicates that the edge device is in an unhealthy state;
in a first instance of the determination where the aggregate difference meets the criteria:
concluding that the edge device has an unhealthy health status;
updating the operation of the distributed system based on the unhealthy health status of the edge device to obtain an updated distributed system; and
providing computer implemented services using the updated distributed system.

17. The data processing system of claim 16, wherein identifying the final portion of the edge devices comprises:
filtering the edge devices based on environments in which each of the edge devices resides to identify a portion of the edge devices that are situated in an environment that is similar to an environment in which the edge device is situated;
filtering the portion of the edge devices based on hosted hardware components of the edge device to identify a second portion of the edge devices that are both situated in the environment that is similar to the environment in which the edge device is situated and that each have hosted hardware components that are similar to hosted hardware components of the edge device; and
filtering the second portion of the edge devices based on workloads performed by the edge device to identify the final portion of the edge devices that:
are situated in the environment that is similar to the environment in which the edge device is situated,
each have hosted hardware components that are similar to hosted hardware components of the edge device, and each host workloads that are similar to workloads hosted by the edge device.

18. The data processing system of claim 16, wherein the metrics for the edge device comprise first measurements of, at least, operational temperatures of the edge device, power consumption by the edge device, and data processing throughput by the edge device, and the metrics for the first edge device comprise second measurements of, at least, operational temperatures of the first edge device, power consumption by the first edge device, and data processing throughput by the first edge device.

19. The data processing system of claim 18, wherein obtaining the differences comprises:
    obtaining the metrics for the first edge device;
    obtaining the metrics for the edge device; and
    computing the difference between the metrics for the first edge device and the metrics for the edge device.

20. The data processing system of claim 16, wherein the aggregate difference is an average difference between the edge device and the final portion of the edge devices.

* * * * *